United States Patent [19]

Lee

[11] Patent Number: 5,621,291
[45] Date of Patent: Apr. 15, 1997

[54] DRIVE CONTROL METHOD OF ROBOTIC VACUUM CLEANER

[75] Inventor: Jae-Bong Lee, Seoul, Rep. of Korea

[73] Assignee: Samsung Electronics Co., Ltd., Suwon, Rep. of Korea

[21] Appl. No.: 415,208

[22] Filed: Mar. 31, 1995

[30] Foreign Application Priority Data

Mar. 31, 1994 [KR] Rep. of Korea ............... 94-6852

[51] Int. Cl.$^6$ ............... B62D 51/04; G05B 15/00
[52] U.S. Cl. ............... 318/568.16; 318/587; 318/568.12; 180/6.5; 180/167; 180/280; 901/1; 901/47; 395/94
[58] Field of Search ............... 364/424.01, 424.02; 180/169, 167, 19.3, 6.5, 274, 280; 318/568.12, 587, 580, 558.16; 901/1, 47; 15/319, 320, 340.4; 395/93–94

[56] References Cited

U.S. PATENT DOCUMENTS

| | | | |
|---|---|---|---|
| 4,796,198 | 1/1989 | Boultinghouse et al. | 180/167 |
| 4,967,862 | 11/1990 | Pong et al. | 180/19.3 |
| 4,996,468 | 2/1991 | Field et al. | 180/169 |
| 5,279,672 | 1/1994 | Betke et al. | 318/587 |
| 5,321,614 | 6/1994 | Ashworth | 364/424.02 |
| 5,440,216 | 8/1995 | Kim | 318/587 |

FOREIGN PATENT DOCUMENTS 58-221925  12/1983  Japan .

*Primary Examiner*—John W. Cabeca
*Attorney, Agent, or Firm*—Burns, Doane, Swecker & Mathis, L.L.P.

[57] ABSTRACT

A self-propelled robotic vacuum cleaner includes independently driven right and left drive wheels, a front sensor emitting ultrasonic waves in a forward direction as the front sensor is oscillated right and left by 180°, and a rear sensor emitting ultrasonic waves in a lateral direction. The ultrasonic waves from the front sensor determine the presence of obstacles in front of the cleaner. The ultrasonic waves from the front and rear sensors together determine a distance between the cleaner and an adjacent wall, as well as an angle formed between the wall and a direction of travel of the cleaner. The respective speeds of the right and left drive wheels are controlled to keep the travel path of the cleaner parallel to the wall and at a predetermined distance therefrom whenever no obstacle is sensed.

1 Claim, 7 Drawing Sheets

DRIVE CONTROL METHOD OF ROBOTIC VACUUM CLEANER

BACKGROUND OF THE INVENTION

1. Field of the Invention

The present invention relates to a robotic vacuum cleaner adapted to move by itself and to clean a floor, more particularly to a driving control method of a robotic vacuum cleaner by which the robotic vacuum cleaner accurately travels along a wall to a target point.

2. Description of the Prior Art

A conventional robotic vacuum cleaner is disclosed in Japanese laid open patent application No. Sho 58-221925.

Accordingly to the Japanese patent application, the robotic vacuum cleaner serves to scan the light from a tape of high reflection factor attached on the floor.

At this time, there is a problem in that the robotic vacuum cleaner is adapted to receive the light reflected from the tape of high reflection attached on the floor to be cleaned, and to move along a track where the tape is attached and to suck-up the dust or foreign objects on the floor. The operational area of the robotic vacuum cleaner is thus confined.

In, another conventional vacuum cleaner, there is a problem in that a suction hose for conducting the dust and the foreign objects must be carried by a user for cleaning, and the hose is of relatively short length.

There is no problem when the cleaning is done in a small space with a short hose but in case of cleaning a wide space, there is a problem in that a body of the cleaner and suction hose must be hand-carried at all times for the cleaning operation.

There is still further problem in that travelling distance of the cleaner is confined by the length of an extension cord for applying a power to the cleaner, and a difficulty arises in using the cleaner because the relatively short length of the extension cord results in frequent connections of the extension cord to other outlets or the usage of a separate extension cord in case of cleaning of a wide spacious area.

SUMMARY OF THE INVENTION

Accordingly, the present invention is disclosed to solve the aforementioned problems and it is an object of the present invention to both provide a drive control method of a robotic vacuum cleaner by which left and right power wheels can be adjusted in power according to a travelling angle thereof and a distance separated from a wall surface to thereby allow the robotic vacuum cleaner to accurately move to a target point along the wall surface without breaking away from a desired path.

It is another object of the present invention to provide a drive control method of a robotic vacuum cleaner by which an advancing direction of the robotic vacuum cleaner can be altered according to a distance to an obstacle existing in the forward direction during the wall following process, to thereby enable the robotic vacuum cleaner to carry out an accurate and quick direction change in response to an abrupt appearance of the obstacle, and to enable a simple construction and a reduction in manufacturing thereof.

In accordance with the objects of the present invention, there is provided a drive control method of a robotic vacuum cleaner for moving by itself to thereby carry out the cleaning operation, the method comprising the steps of:

detecting a distance to an obstacle and whether or not there is an obstacle by means of a navigation sensor during a wall following process thereof;

detecting a travel angle of the cleaner and a distance to a wall surface according by means of the navigation sensor and an ultrasonic sensor when the obstacle is not detected at the obstacle detecting step; and controlling a travel of the cleaner along a desired path relative to the wall surface by controlling the power of left and right power wheels in accordance with the travel angle of the cleaner and the distance from the wall surface detected in the travel condition detecting step.

BRIEF DESCRIPTION OF THE DRAWINGS

For a fuller understanding of the nature and objects of the invention, reference should be made to the following detailed description taken in conjunction with the accompanying drawings in which.

DETAILED DESCRIPTION OF THE PREFERRED EMBODIMENT OF THE INVENTION

The preferred embodiment of the present invention will now be described in detail with reference to the accompanying drawings.

Figure 1:
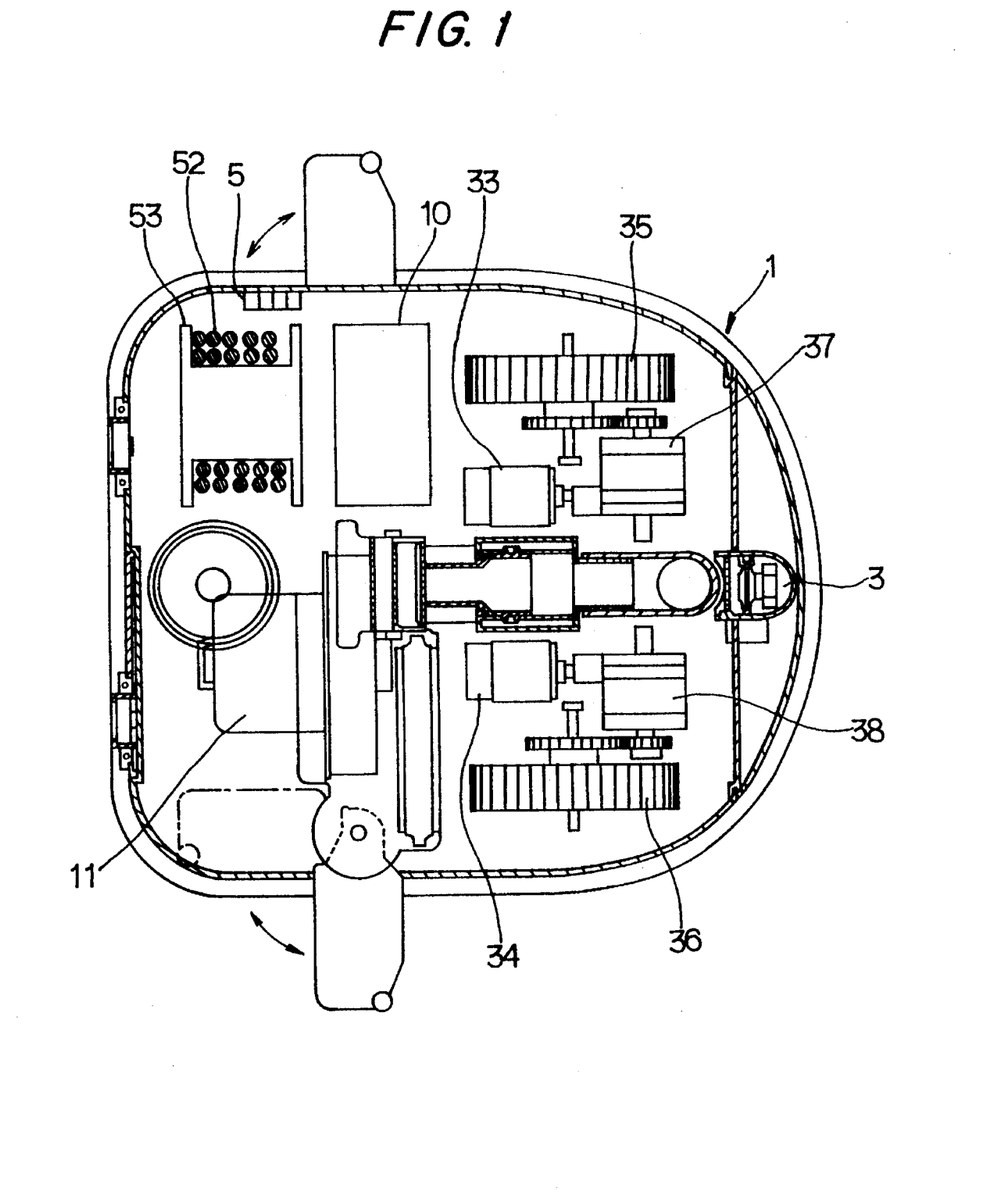
FIG. 1 is a plan view of a robotic vacuum cleaner with an upper cover of thereof having been removed according to the present invention.

Reference numeral 1 in FIGS. 1 and 2 denotes a body of the robotic vacuum cleaner 1 (hereinafter referred to as cleaner), where a navigational ultrasonic sensor 3 (hereinafter referred to as navigation sensor) is provided on a front surface thereof in order to emit ultrasonic waves generally forward of the cleaner 1. The waves are directed over an approximate angle of 180 degrees due to a turning of the sensor by a driving unit such as a motor 65 (see FIG. 3). Thus, the navigation sensor can detect whether or not there exists an obstacle within a 180° scope. Depicted in FIGS. 5A and 5B a distance G to an obstacle B and a distance d1 to a wall surface W as the sensor 3 oscillates and simultaneously receives the ultrasonic waves reflected from the obstacle B or the wall surface W.

Furthermore, there is arranged a fixed ultrasonic sensor 5 (hereinafter referred to as ultrasonic sensor) at a lateral rear side of the cleaner 1 in order to detect an object fixedly lying in a direction, normal to the travel direction of the cleaner, e.g., a distance d2 from the wall surface W. The sensor 5 emits ultrasonic waves and simultaneously receives signals when the emitted ultrasonic waves are reflected from the wall surface W.

Left and right steering motors 33 and 34 are disposed and to the left and right of the navigation sensor 3 in order to generate a driving force so that the cleaner 1 can change between forward, reverse, left and right directions of travel. The left and right steering motors 33 and 34 are mounted on respective shafts, with left and right clutches 37 and 38 interrupting a driving force applied to the wheels 35 and 36.

The cleaner 1 is equipped at a rear surface thereof with a cable assembly 53 including a spool on which a power cable 52 is wound for being led in or led out of an outlet according to the direction of travel of the cleaner.

The cable assembly 53 is provided at a front surface thereof with a battery 10 for supplying a driving energy to the cleaner 1.

The cleaner 1 is provided therein with a suction motor 11 for generating a suction force in order to suck-in the dust, foreign objects and the like, and the suction motor 11 is disposed behind a dust collecting chamber 17 where a dust collecting pocket 15 is provided in order to collect the dust, foreign objects and the like being sucked through a suction port 13.

The cleaner 1 is provided at a rear floor surface thereof with a powerless wheel 39 for supporting a rear weight thereof and the powerless wheel 39 serves to rotate 360 degrees to facilitate an easy change of travelling route of the cleaner 1.

Figure 2:
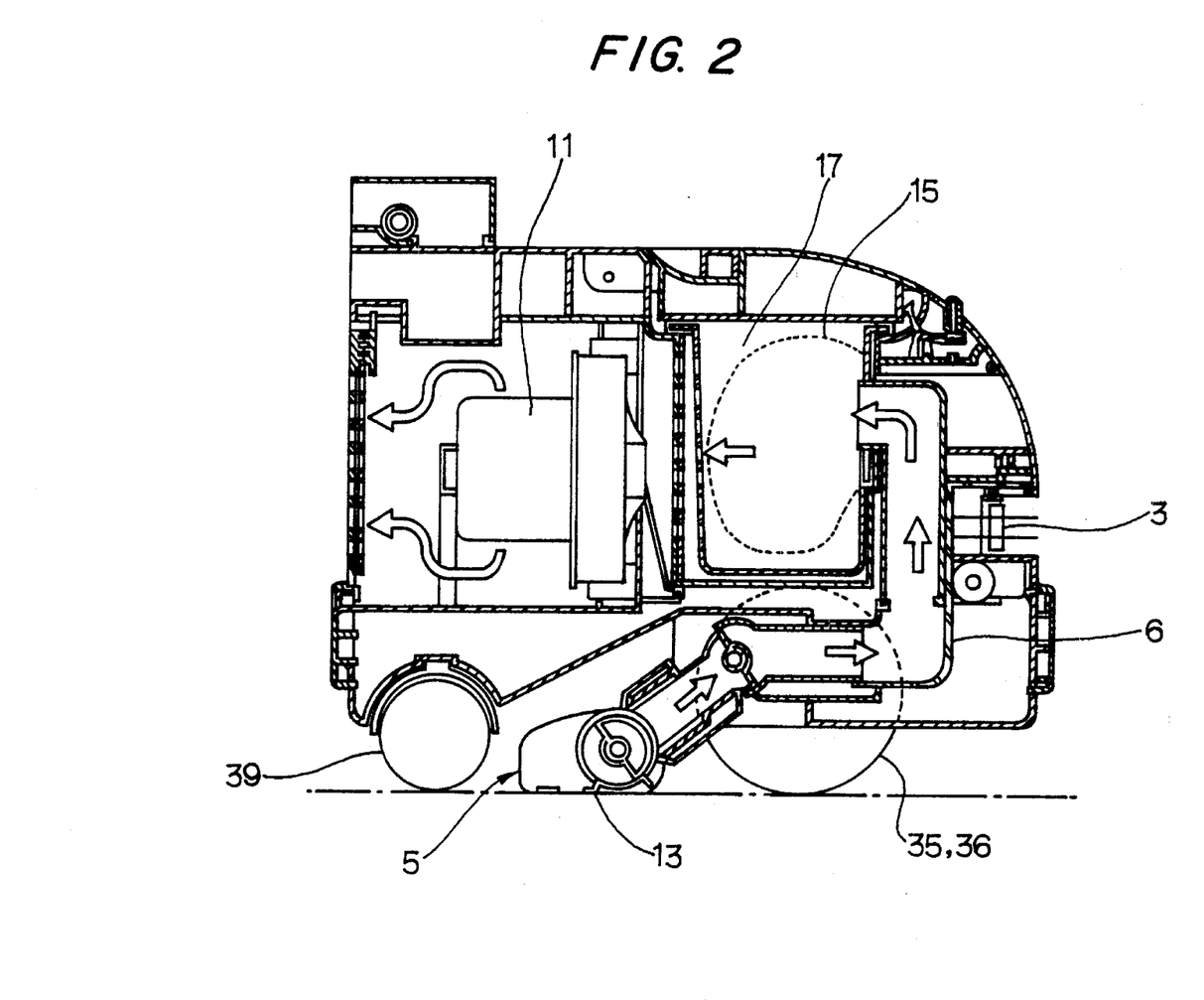
FIG. 2 is a vertical sectional view through the robotic vacuum cleaner depicted in FIG. 1.

As illustrated in FIG. 2, a brush 9 for collecting the dust, foreign objects and the like from the floor is provided between the powerless wheel 39 and the left and right power wheels 35 and 36, and the dust, foreign objects and like sucked in through the suction port 13 formed at a rear side of the brush 9 is collected at the dust collecting pocket 15 through a duct.

The control block diagram of the cleaner according to the embodiment of the present invention will now be described with reference to FIG. 3.

Figure 3:
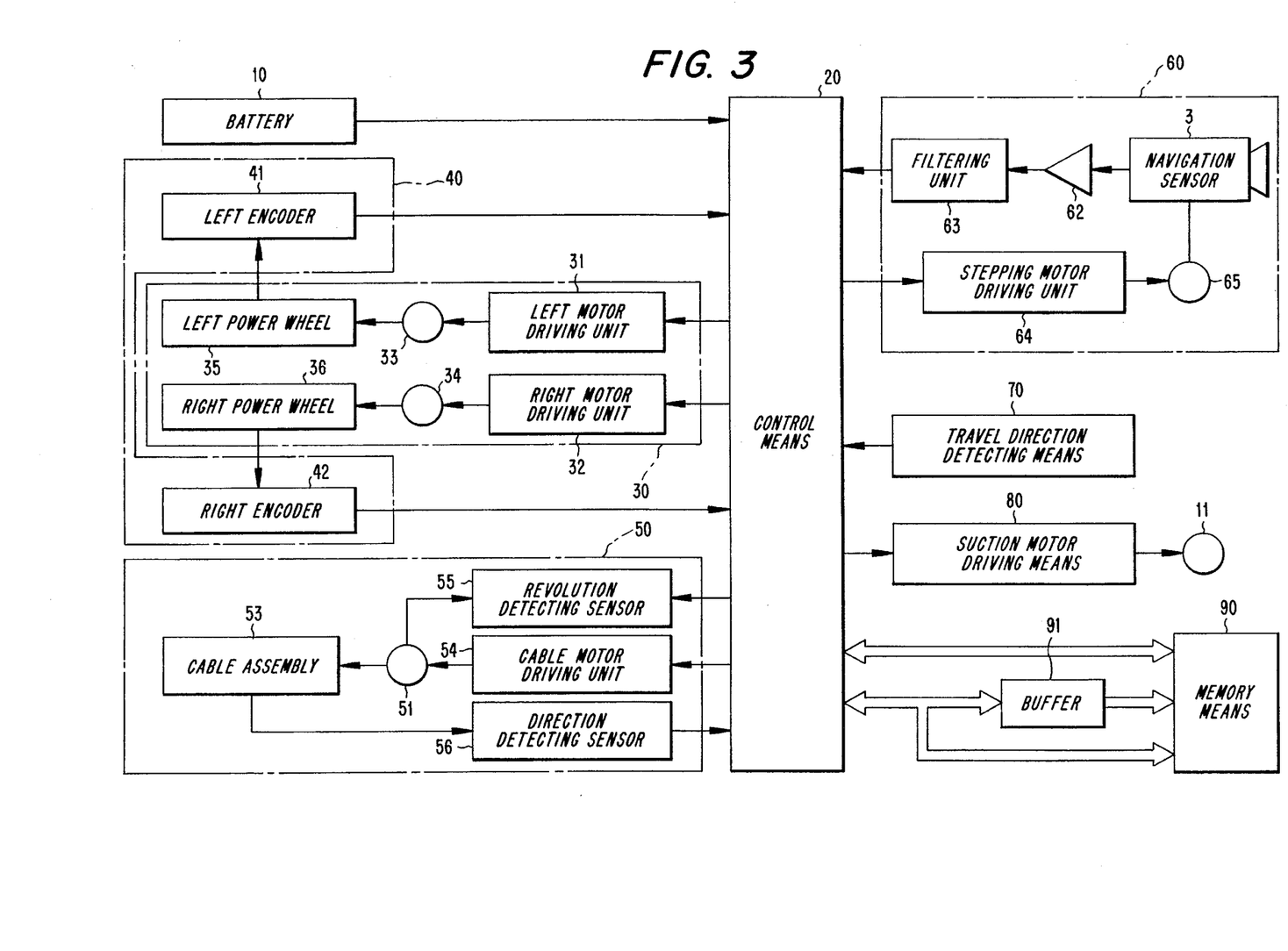
FIG. 3 is a control block diagram for the robotic vacuum cleaner according to the present invention.

As illustrated in FIG. 3, control means 20 is a microcomputer adapted to receive a direct current DC voltage supplied from the battery 10 to thereby control an overall travelling movement of the cleaner 1.

Driving means 30 serves to control movement of the cleaner 1 in the forward, reverse, left and right directions according to signals from the control means 20, wherein the driving means 30 includes a left motor driving unit 31 for driving the left steering motor 33 so that the cleaner 1 can be moved to the right, and a right motor driving unit 32 for driving the right steering motor 34 so that the cleaner 1 can be moved to the left.

Travel distance detecting means 40 serves to detect a travelled distance of the cleaner 1 travelling under the control of the control means 20; wherein the travel distance detecting means 40 includes a left encoder 41 for generating a pulse signal in proportion to a revolution of the left steering motor 33, in other words, a revolution of the left power wheel 35 rotating according to the drive of the left steering motor 33, to thereby detect a travelled distance which the cleaner 1 has covered toward the right, and a right encoder 42 for generating a pulse signal in proportion to a revolution of the right steering motor 34, in other words, a revolution of the right power wheel 36 rotating according to the drive of the right steering motor 34, to thereby detect a travelled distance of the cleaner 1 to the left.

Furthermore, tension adjusting means 50 serves to maintain at a predetermined level a tension of the power cable 52 led in and led out of the outlet according to the control of the control means 20 during the cleaning operation of the cleaner 1, wherein the tension adjusting means 50 includes a motor having a capacity of the spool of the cable assembly 53 in the forward and reverse directions, based on a signal from, a cable motor driving unit 54 so that the power cable 52 can be wound on the cable assembly 53 or unwound from the cable assembly 53 according to the control of the control means 20. A revolution detecting sensor 55 detects the revolutions of the shaft of the motor 51 driven by the cable motor driving unit 54 and transmits that information to the control means 20. A direction detecting sensor 56 detects the revolutions and rotating directions of the cable assembly 53 rotated by the motor 51, and transmits that information to the control means 20.

Furthermore, obstacle detecting means 60 serves to detect a distance G to the obstacle B, a distance d1 from the wall surface W and the existence or non-existence of the obstacle B on the travelling route of the cleaner 1 moving according to the control means 30. The obstacle detecting means 60 includes the navigation sensor 3 for emitting ultrasonic waves laterally to the wall surface W and forwardly of the cleaner 1 and for simultaneously receiving a signal reflected from the wall surface W or the obstacle B, to thereby detect the distance G to the obstacle B and the distance d1 to the wall surface W. An amplifying unit 62 amplifies the signal detected by the navigation sensor 3, and a filtering unit 63 filters noise from the signal amplified by the amplifying unit 62. A stepping motor driving unit 64 drives a stepping motor 65 accoridng to the control of the control means 20 so that the navigation sensor 3 can rotate back and fourth by 180 degrees.

Travel direction detecting means 70 is a gyro sensor adapted to detect a travel direction change of the cleaner 1 by detecting a rotating angle according to a voltage level changing in the course of the rotation of the cleaner 1 so that the travel direction of the cleaner 1 moving in accordance with the control of the control means 20 can be detected. A suction motor driving means 80 serves to controllably drive the suction motor 11 according to the control of the control means 20 so that the cleaner 1 can carry out the cleaning operation.

Memory means 90 serves to extend a memory capacity to an input port and an output port of the control means through a buffer 91 when the memory capacity for controlling the driving means 30, tension adjusting means 50, obstacle detecting means 60 and the like is not large enough. A dynamic Random Access Memory DRAM and the like are used for the memory means 90.

An operation effect of the drive control method of the robotic vacuum cleaner thus constructed will now be described.

Figure 4A:
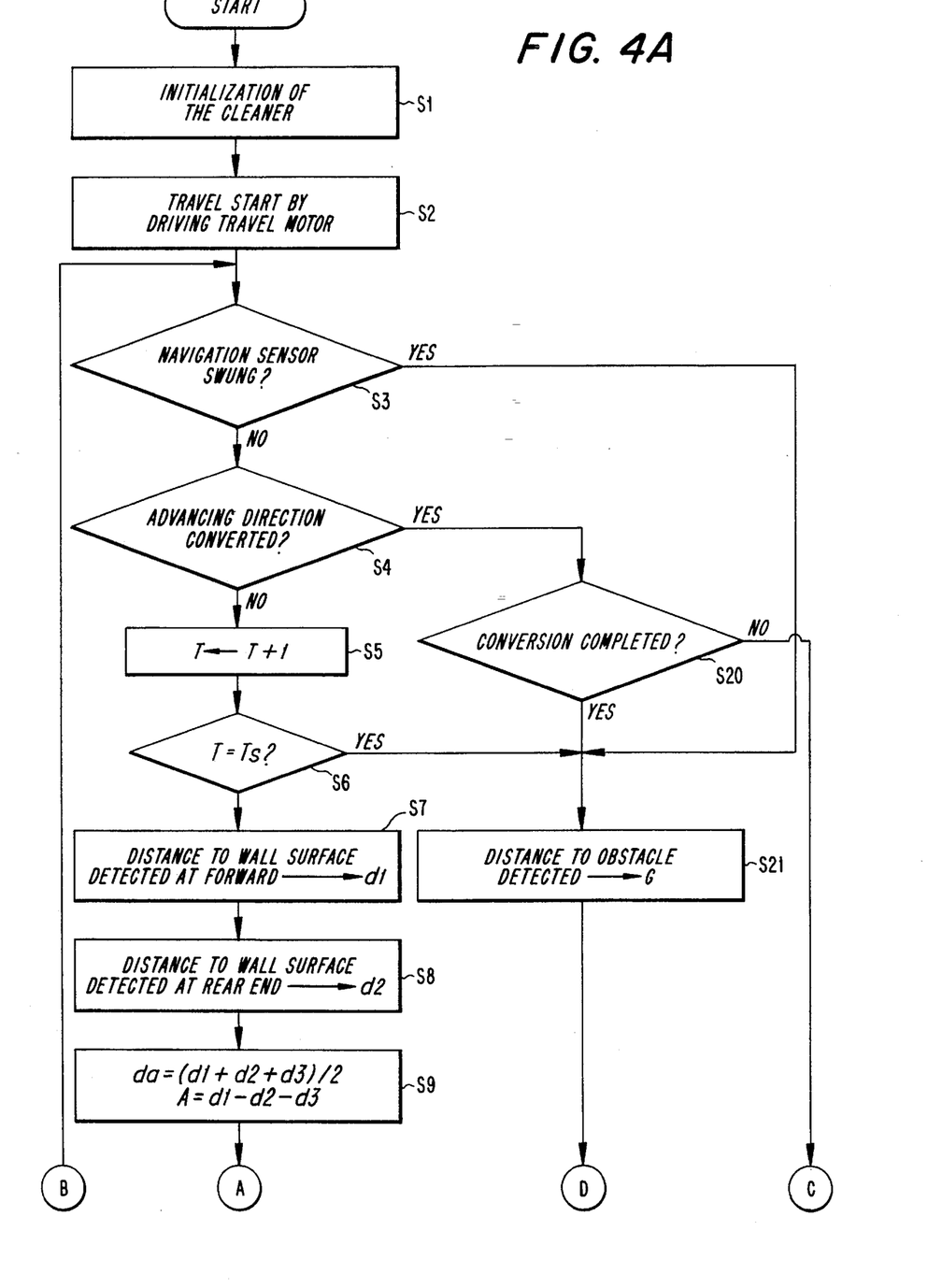
FIGS. 4A, 4B and 4C are flow charts for illustrating operating sequences of a travelling control of the robotic vacuum cleaner according to the present invention.
Figure 4B:
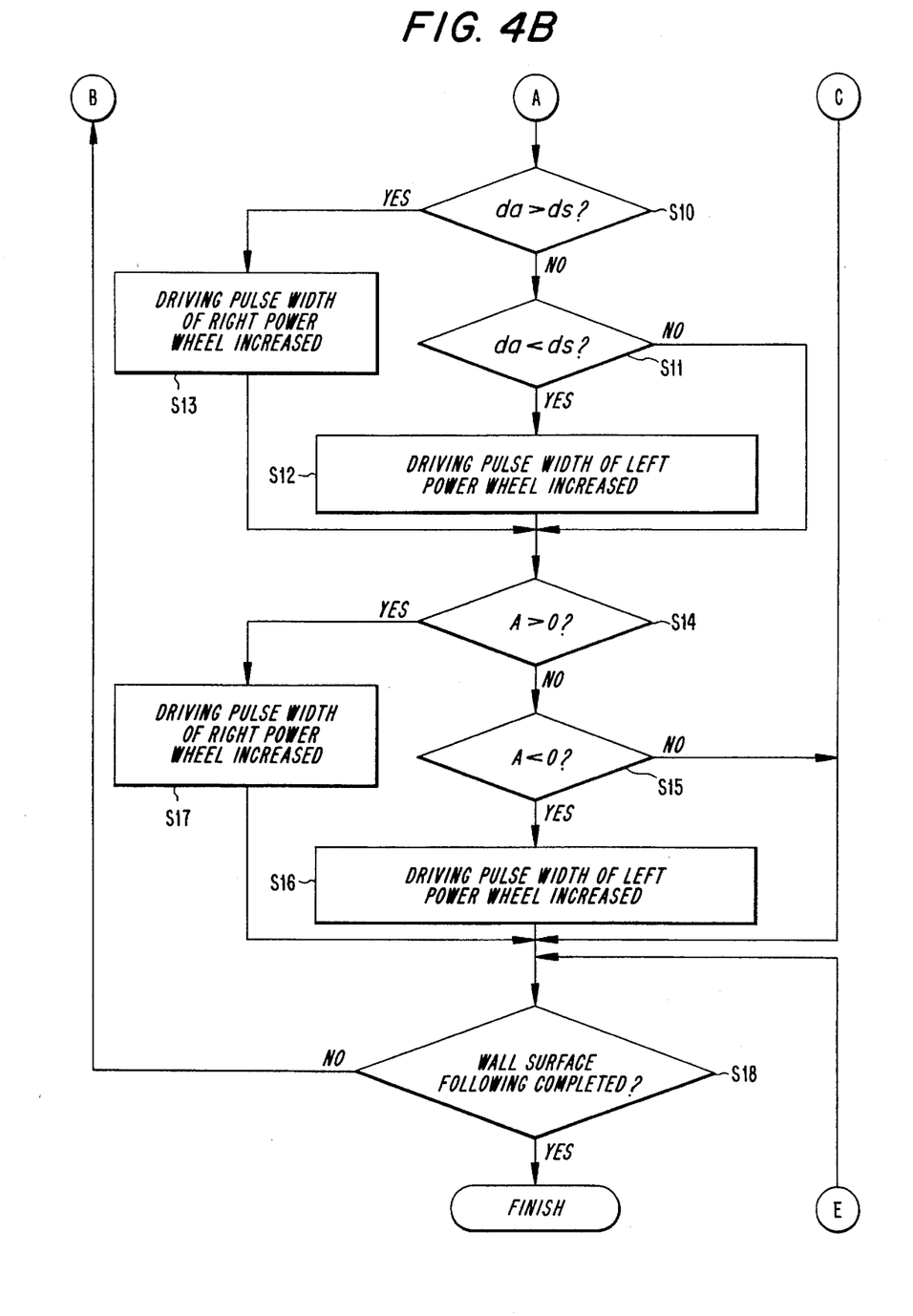
Figure 4C:
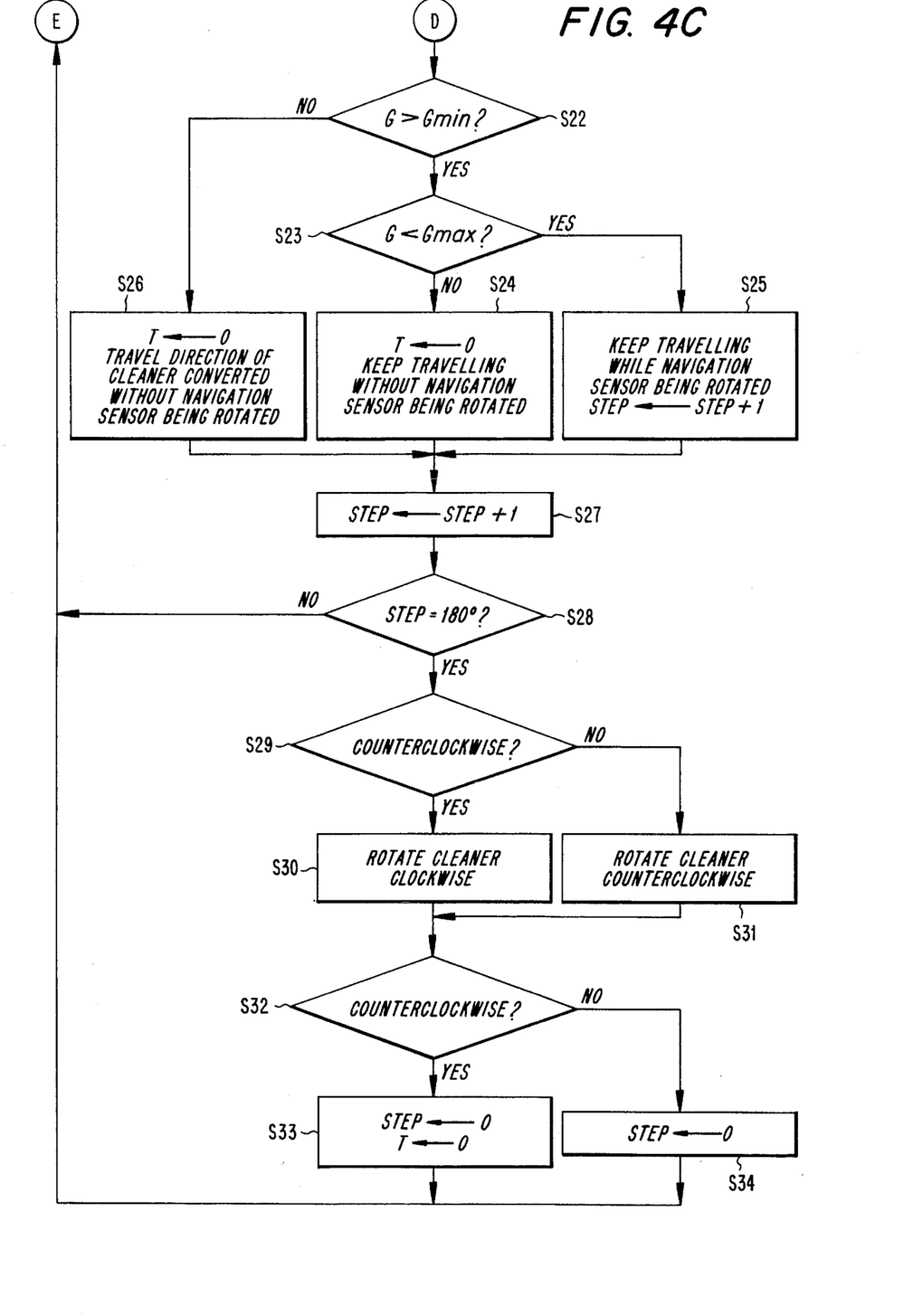

FIGS. 4A, 4B and 4C are flow charts for an operational sequence of the drive control in the robotic vacuum cleaner according to the present invention, and reference symbol S in FIGS. 4A, 4B and 4C denotes step.

First of all, when a user activates an operation switch provided at a predetermined position of the cleaner 1, the DC voltage supplied from the battery 10 is received by the control means 20, step S1, to thereby the operation of the cleaner 1.

Then, at step S2, the control means 20 outputs to the driving means 30 a control signal for enabling the cleaner 1 to travel adjacent the wall W, i.e., a wall following action.

Accordingly, the left motor driving unit 31 and the right motor driving unit 32 receive the control signal generated from the control means 20, to thereby drive the left steering motor 33 and the right steering motor 34, and the cleaner 1 now starts the wall following.

At this time, the left encoder 41 generates pulse signals in proportion to the number of revolutions of the left power wheel 35 according to the drive of the left steering motor 33, and supplies that information to the control means 20, and the right encoder 42 generates pulse signals in proportion to the number of revolutions of the right power wheel 36 according to the drive of the right steering motor 34, and supplies that information to the control means 20.

Consequently, the control means 20 receives the pulse signal generated from the left and right encoders 41 and 42 to thereby calculate the distance travelled by the cleaner 1.

Meanwhile, the travel direction detecting means 30 receives a power from the left and right steering motors 33 and 34 to thereby detect rotational angular velocities of the left and right power wheels 35 and 36 rotating according to the power from the left and right steering motors 33 and 34, and supplies that data to the control means 20.

Therefore, the control means 20 integrates with respect to time the rotational angular data detected by the travel direction detecting means 70, to thereby detect any travel direction change of the cleaner 1, and thereafter the left and right motor driving units 31 and 32 are controlled in order that the cleaner 1 can accurately travel to the target point along the wall surface W without straying from a desired path.

A discrimination is made at step S3 as to whether the navigation sensor 3 mounted on a front surface of the cleaner 1 is swinging, and in case the navigation sensor 3 is not swinging (in case of NO), since the cleaner 1 is moving along the wall surface W, a discrimination is made at step S4 as to whether the cleaner 1 is in the midst of changing an advancing direction thereof.

As a result of the discrimination at step S4, if the cleaner 1 has not changed the advancing direction (in case of NO), the control means 20 adds 1 at step S5 to an obstacle detecting period T for detecting the obstacle B to thereby increase a period conversion value T of the cleaner 1 because the cleaner 1 is now in the midst of moving along the wall surface W.

Accordingly, at step S6, a discrimination is made as to whether the period conversion value T is the same as a basic period data Ts (a basic frequency for detecting the obstacle periodically during the cleaner's travel) entabished at the control means 20.

As a result of the discrimination at step S6, if the period conversion value T discriminated at the control means 20 is not the same as the basic period data Ts (in case of NO), the flow advances to step S7 because there is no need to detect the obstacle B lying forward of the cleaner 1.

Figure 5A:
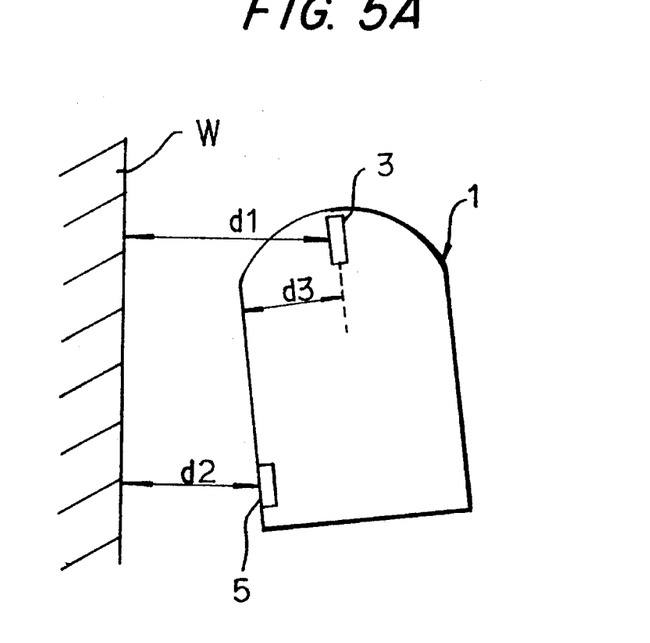
FIGS. 5A and 5B are schematic diagrams depicting the robotic vacuum cleaner in relation to a wall and another obstacle.
Figure 5B:
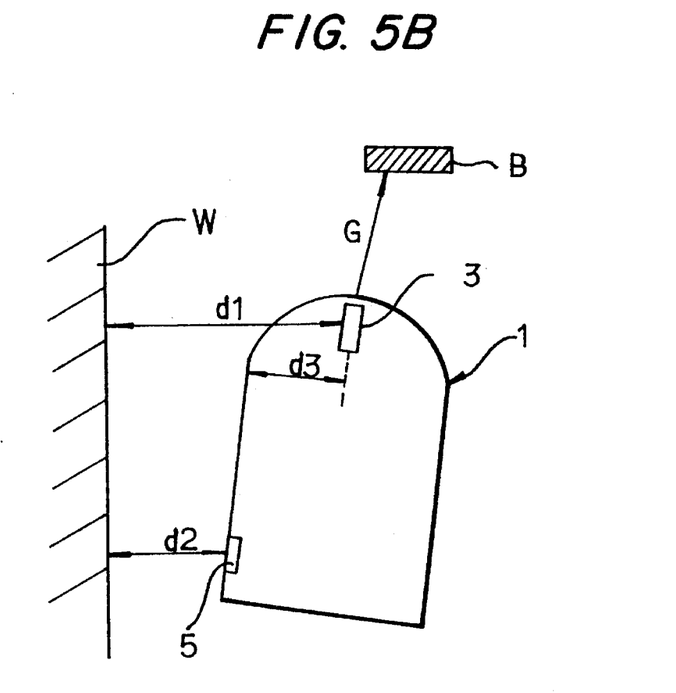

The navigation sensor 3 emits the ultrasonic waves to the wall surface W, as illustrated in FIGS. 5A and 5B, and receives a signal reflected from the wall surface W.

The signal received by the navigation sensor 3 is amplified through a first amplifier G2 and the noise components contained in the amplified signal are filtered by the filtering unit 63. The distance d1 between the wall surface W and the front side of the cleaner is now detected and output to the control means 20.

Accordingly, the control means 20 receives the signal detected by the navigation sensor 3 and calculates the distance d1 between the cleaner 1 and the wall surface W.

Then, at step S8, the ultrasonic sensor 5 mounted at a rear side portion of the cleaner 1 emits ultrasonic waves to the wall surface W, as illustrated in FIGS. 5A and 5B and receives ultrasonic waves reflected from the wall surface W to detect the distance d2 between a side surface of the cleaner 1 and the wall surface W and outputs that information to the control means 20.

At step S9, the control means 20 receives the distance data d1 detected by the navigation sensor 3 and another distance data d2 detected by the ultrasonic sensor 5 and calculates a mean distance da between the cleaner 1 and the wall surface W according to a formula 1 (described hereunder), and also calculates a travel angle A of how the cleaner 1 is inclined from a parallel relationship with the wall surface W.

$$da = \frac{d1 + d2 - d3}{2} \quad 1$$

$$A = d1 - d2 - d3 \quad 2$$

Where, d3 denotes a distance between the navigation sensor 3 and a front side end of the cleaner 1, on which the navigation sensor 3 is seated.

Accordingly, at step S1O, a discrimination is made as to whether the mean distance da calculated at step S9 is larger than a reference distance data ds previously established at the control means 20 (a predetermined distance to be maintained by the cleaner 1 during the wall following), and if the mean distance da discriminated by the control means 20 is not larger than the reference distance data ds (in case of NO), the flow advances to step S11, and discriminate whether the mean distance da is smaller than the reference distance data ds.

As a result of the discrimination at step S11, if the mean distance da discriminated by the control means 20 is smaller than the reference distance data ds (in case of YES), flow proceeds to step S12 because the cleaner is in a state of being very close to the wall surface W.

The control means now serves to generate a control signal to the left motor driving unit 31 so that the cleaner 1 can maintain a predetermined distance from the wall surface W.

Accordingly, the left motor driving unit 31 receives the control signal output from the control means 20 to thereby drive the left steering motor 33, so that the left power wheel 35 can receive the power to start the driving.

Meanwhile, as a result of the discrimination at step S10, if the mean distance da discriminated at the control means 20 is larger than the reference distance data ds (in case of YES), the control means 20 outputs the control signal to the right motor driving unit 32 so as to maintain the cleaner 1 at a predetermined distance from the wall surface W, because the cleaner is in a state of being separated too much from the wall surface W.

Then, the right motor driving unit 32 receives the control signal generated from the control means 20 to thereby drive the right steering motor 34, and now the right power wheel 36 receives the power to thereby start driving.

Likewise, when the cleaner 1 maintains the predetermined distance from the wall surface W according to the driving of the left and right power wheels 35 and 36, a discrimination is made at step S14 as to whether the travel angle A calculated at step S9 is larger than 0 (a basic angle at which the cleaner 1 travels parallel to the wall surface).

As a result of the discrimination at step S14, if the travel angle A is not larger than 0 (in case of NO), operation proceeds to step S15 to thereby discriminate whether the travel angle A discriminated at the control means 20 is smaller than 0.

As a result of the discrimination at step S15, if the travel angle A is smaller than 0 (in case of YES), flow advances to step S16 because the cleaner 1 is in a state of travelling counterclockwise, thereby causing the control means 20 to generate the control signal to the left motor driving unit 31 in order that the cleaner 1 can move parallel to the wall surface W.

Accordingly, the left motor driving unit 31 receives the control signal generated from the control means 20 to thereby drive the left steering motor 33 so that the power can be transmitted to the left power wheel 35 to start driving.

Meanwhile, as a result of the discrimination at step S14, if the travel angle A discriminated from the control means 20 is larger than 0, (in case of YES), flow advances to step S17 because the cleaner 1 is in a state of travelling clockwise and the control means 20 serves to generate the control signal to the right motor driving unit 32 in order to cause the cleaner 1 to travel parallel to the wall surface W.

Accordingly, the right motor driving unit 32 receives the control signal from the control means 20 to thereby drive the right steering motor 34, and the right power wheel 36 receives the power therefrom to thereby start driving.

Likewise, when the cleaner 1 travels parallel to the wall surface W, step S18 discriminates whether the cleaner 1 has completed the wall following.

As a result of the discrimination at step S18, if the cleaner 1 has not finished the wall following (in case of NO), flow returns to step S3 and repeats operations subsequent to step S3.

If the cleaner has completed the wall following (in case of YES), the cleaner stops the wall following and finishes the operation.

Meanwhile, as a result of the discrimination at step S4, if the cleaner 1 has changed its advancing direction (in case of YES), flow proceeds to step S20 and discriminates whether the cleaner 1 has completed the advancing direction change in order to detect whether or not an obstacle B lies in the changed advancing direction.

As a result of the discrimination at step S20, if the cleaner has not completed the advancing direction change (in case of NO), flow advances to step S18 because there is no need to detect whether or not there is an obstacle. So, the flow discriminates whether the cleaner 1 has finished the wall following, to thereby cause the control means 20 to control movement of the cleaner 1 according to the discrimination thereof.

Furthermore, as a result of discrimination at step S20, if the cleaner has completed the advancing direction change (in case of YES), the navigation sensor 3 emits ultrasonic waves in the forward direction and receives a signal from the ultrasonic waves reflected from the obstacle B to thereby detect a distance G from the obstacle B and output the same to the control means, because the movement of the cleaner 1 should be controlled according to the distance G from the obstacle B based upon the changed advancing direction.

Accordingly, at step S22, a discrimination is made as to whether the distance G detected by the navigation sensor 3 is larger than a minimum distance data Gmin (a minimum distance according to an existence of an abrupt obstacle) previously established at the control means 20, and if the distance G is larger than the minimum distance data Gmin (in case of YES), flow proceeds to step S23 and discriminates whether the distance G detected by the navigation sensor 3 is smaller than a maximum distance data Gmax (a maximum distance for determining whether or not the navigation sensor has rotated) previously established at the control means 20.

As a result of the discrimination at step S23, if the distance G detected by the control means 20 is not smaller than the maximum distance data Gmax (in case of NO), the flow advances to step S24. At step S24, the control means 20 clears the period conversion value T for detecting the obstacle B without rotating the navigation sensor 3 so that the cleaner 1 can keep performing the wall following, because the cleaner 1 is located far away from the obstacle B.

Meanwhile, as a result of the discrimination at step S23, if the distance 0 discriminated by the control means 20 is smaller than the maximum distance data Gmax (in case of YES), the flow proceeds to step S25. At step S25, the control means 20 generates the control signal to the stepping motor driving unit 64 in order to discrminate whether the obstacle B has been created by the noise, because cleaner 1 is in a state of being close to the obstacle B.

Accordingly, the stepping motor driving unit 64 serves to receive the control signal output from the control means 20 to thereby drive the stepping motor 65, so that the navigation sensor 3 can be rotated 180 degrees clockwise whereby it can monitor forward, and at the same time, increases by one a position angle (step) of the navigation sensor 3 to thereby cause the cleaner 1 to keep performing the wall following.

Furthermore, as a result of the discrimination at step S22, if the distance G discrminated by the control means 20 is not larger than the minimum distance data Gmin (in case of NO), the flow proceeds to step S26 because there has appeared an obstacle B ahead of the cleaner 1. At step S26, the control means does not rotate the navigation sensor 3 but changes the advancing direction of the cleaner 1.

At this time, when the cleaner 1 draws near a maximum approximate distance to seek a new wall surface to follow along, the navigation sensor 3 serves to put the cleaner 1 at a position for detecting a distance from the new wall surface, and clears the period conversion value T for detecting the obstacle B and rotates the cleaner 1 clockwise.

When the control means completes the movement of the cleaner 1 by controlling the same according to the distance from the obstacle B, flow advances to step S27 and increases by 1 the position angle (step) of the navigation sensor 3, and flow proceeds to step S28, and discrminates whether the increased position angle (step) of the navigation sensor 3 is 180 degrees.

As a result of the discrmination at step S28, if the position angle (step) discriminated by the control means 20 is not 180 degrees (in case of NO), flow advances to step S18 and repeats operations subsequent to step S18, and if the position angle (step) is 180 degrees (in case of YES), flow proceeds to step S29 and discriminates whether the cleaner 1 is positioned at a counterclockwise place.

As a result of the discrimination at step S29, if the cleaner 1 is at a counterclockwise place (in case of YES), flow advances to step S30, and the cleaner 1 is rotated clockwise, and if the cleaner is not at the counterclockwise place (in case of NO), flow proceeds to step S31 and the cleaner 1 is rotated counterclockwise.

After the cleaner 1 is rotated clockwise or counterclockwise, flow advances to step S32, where it is once again discriminated whether the cleaner 1 is at a counterclockwise position.

As a result of the discrimination at step S32, if the cleaner 1 is positioned at the counterclockwise place (in case of YES), flow proceeds to step S33, where the control means 20 clears the period conversion value T for detecting the obstacle B and the position angle (step) of the navigation sensor 3, and the flow now returns to step S18 and repeats operations subsuquent to step S18.

Meanwhile, as a result of the discrimination at step S32, if the cleaner 1 is not at the counterclockwise position (in case of NO), flow proceeds to step S24, where the control means 20 clears the period conversion value T for detecting the obstacle B, and the flow proceeds to step S34 where the period conversion value T for detecting the obstacle B is cleared by the control means 20.

The flow returns to step S18 and repeats operations subsequent to step S18.

As is apparent from the foregoing, according to the drive control method of the robotic vacuum cleaner, there is an advantage in that power of the left and right power wheels is adjusted according to the travelling angle and the distance by which the cleaner is separated from the wall surface, to thereby allow the cleaner to accurately travel to a target point along the wall surface without straying from a desired path.

According to the drive control method of the robotic vacuum cleaner, there is another advantage in that the cleaner can change the direction of the forward movement according to the distance to the obstacle existing ahead of the cleaner when the cleaner is performing the wall surface following, thereby allowing the cleaner to cope with an abrupt appearance of an obstacle by way of a quick and accurate change of forward movement, and at the same time, there is still another advantage in that production cost thereof is reasonably low due to its simple construction.

What is claimed is:

1. A method of controlling the travel of a self-propelled robotic vacuum cleaner relative to a wall, the cleaner including independently driven right and left drive wheels, a navigation sensing first unit for emitting first ultrasonic waves in a forward direction and receiving reflected first ultrasonic waves, and an ultrasonic sensing second unit for emitting second ultrasonic waves in a lateral direction and receiving reflected second ultrasonic waves, the method comprising the steps of:

A) advancing the cleaner in a travel path alongside a wall by driving the drive wheels, while emitting first and second ultrasonic waves from the first and second sensing units, respectively;

B) oscillating the navigation sensing unit to the right and left through an angle while emitting the first ultrasonic waves and determining from the first ultrasonic waves reflected off an obstacle whether an obstacle lies in the travel path, and a distance between the cleaner and any detected obstacle;

C) determining from the first and second ultrasonic waves reflected off the wall, when no obstacle is sensed in step B, a travel angle formed by the travel path relative to the wall, and a distance from the cleaner to the wall;

D) controlling the first and second drive wheels to maintain the travel path substantially parallel to the wall by changing the relative speeds between the right and left drive wheels to bring the travel angle to zero when the travel angle is determined to be different from zero in step C;

E) controlling the drive wheels to maintain the travel path substantially parallel to the wall at a selected distance from the wall by:

E1) increasing a speed of one of the right and left drive wheels located farther from the wall than the other of the right and left drive wheels to move the cleaner closer to the wall when the distance between the cleaner and wall determined in step C is greater than a reference distance, and E2) increasing a speed of the other of the right and left drive wheels to move the cleaner farther from the wall when the distance between the cleaner and wall determined in step C is less than the reference distance; and F) changing the travel path from the substantially parallel relationship with the wall in response to detecting, in step B, an obstacle within a predetermined distance from the cleaner, to avoid collision with the obstacle.

* * * * *